US011012241B2

(12) United States Patent
Nelson

(10) Patent No.: US 11,012,241 B2
(45) Date of Patent: May 18, 2021

(54) INFORMATION HANDLING SYSTEM ENTITLEMENT VALIDATION

(71) Applicant: Dell Products L.P., Round Rock, TX (US)

(72) Inventor: Amy Christine Nelson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 250 days.

(21) Appl. No.: 16/126,809

(22) Filed: Sep. 10, 2018

(65) Prior Publication Data

US 2020/0084042 A1  Mar. 12, 2020

(51) Int. Cl.
*H04L 29/06* (2006.01)
*H04L 9/32* (2006.01)
*H04L 9/08* (2006.01)
*H04L 9/30* (2006.01)

(52) U.S. Cl.
CPC .......... *H04L 9/3247* (2013.01); *H04L 9/0894* (2013.01); *H04L 9/30* (2013.01); *H04L 9/3234* (2013.01)

(58) Field of Classification Search
CPC ....... H04L 9/0894; H04L 9/30; H04L 9/3226; H04L 9/3234; H04L 9/3247; H04L 9/0877
See application file for complete search history.

(56) References Cited

U.S. PATENT DOCUMENTS

| | | | |
|---|---|---|---|
| 8,615,446 B2 | 12/2013 | O'Connor et al. | |
| 8,832,032 B2 | 9/2014 | O'Connor et al. | |
| 9,100,396 B2 | 8/2015 | O'Connor et al. | |
| 9,235,399 B2 | 1/2016 | O'Connor et al. | |
| 9,785,801 B2 | 10/2017 | Zimmer et al. | |
| 2008/0319779 A1* | 12/2008 | Hughes | G06Q 30/06 705/310 |
| 2009/0049542 A1* | 2/2009 | DeYonker | G06F 21/10 726/18 |
| 2009/0300772 A1* | 12/2009 | Al-Azzawi | G11B 20/00847 726/26 |
| 2011/0167503 A1* | 7/2011 | Horal | G06F 21/10 726/33 |
| 2012/0151574 A1* | 6/2012 | Zhang | H04L 63/12 726/19 |
| 2013/0111592 A1* | 5/2013 | Zhu | G06F 21/577 726/25 |
| 2017/0286705 A1 | 10/2017 | Li et al. | |
| 2017/0300708 A1* | 10/2017 | Gopshtein | G06F 21/31 |
| 2019/0028281 A1* | 1/2019 | Turissini | G09C 1/00 |
| 2020/0050798 A1* | 2/2020 | Jiang | G06F 21/52 |

* cited by examiner

*Primary Examiner* — Joseph P Hirl
*Assistant Examiner* — Ka Shan Choy
(74) *Attorney, Agent, or Firm* — Zagorin Cave LLP; Robert W. Holland

(57) ABSTRACT

Validation of entitlements to software is provided with a Trusted Platform Module (TPM) platform hierarchy private key created at manufacture of an information handling system and an associated public key. At initiation of an entitlement request, such as to install a software application, a verification signature associated with the request is verified by the TPM to ensure that the information handling system is entitled to run the software.

5 Claims, 5 Drawing Sheets

INFORMATION HANDLING SYSTEM ENTITLEMENT VALIDATION

BACKGROUND OF THE INVENTION

Field of the Invention

The present invention relates in general to the field of information handling system software management, and more particularly to an information handling system entitlement validation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include an operating system that executes on a central processing unit (CPU), such as WINDOWS. Generally, the operating system supports execution of applications by the CPU through application programming interfaces (APIs) that applications leverage to perform functions. Typically, the operating system and applications execute software stored in persistent memory, such as a solid state drive (SSD) or hard disk drive (HDD), and retrieved to random access memory (RAM). Generally, the operating system and applications are licensed by their developers to permit copying in memory and execution on the CPU. Typical software licenses may associate authorization to use software based upon a particular end user, a particular information handling system and/or a particular organization, such as an enterprise. Often, software authorization on an information handling system is provided with a key input to the system that unlocks the software for execution. Software authorization keys generally fail to securely tie software application authorization to a particular information handling system. For example, malicious actors can implement changes to system information, such as a system identifier, so that the relationship between the software authorization key and the system identifier become unreliable.

Generally, information handling system software authorization involves both tracking authorization to use licensed software and preventing execution of unauthorized software, such as unlicensed software copies and malware. For example, malicious actors will attempt to hack into information handling system data by inserting malicious code into the information handling system for execution. In some instances, malicious code is included in otherwise authorized code so that an end user executing authorized code unknowingly permits malicious code onto an information handling system. To help manage software authorization, the computer industry conceived a Trusted Platform Module (TPM) standard in 2003, which has been updated several times since the initial release. TPM includes a random number generator, cryptographic keys, remote attestation, binding and sealing that authenticates software executed on an information handling system. For example, a TPM microprocessor included in an information handling system includes unique and secret RSA and ECC keys pre-programmed or programmable at production that are used as a security reference. A TPM helps to ensure platform integrity by verifying that a boot process starts from a trusted combination of hardware and software to continue until an operating system is fully booted and applications are executing. For example, the Unified Extensible Firmware Interface (UEFI) standard uses a TPM to form a root of trust by reference to Platform Configuration Registers (PCRs) that allow secure storage of relevant security metrics. In 2015, TPM 2.0 was released to add security feature improvements over the original TPM. For example, TPM 2.0 supports different types of platforms, algorithms and crypto primitives. Instead of the single storage hierarchy of TPM 1.2, TPM 2.0 supports three hierarchies: a platform, storage and endorsement hierarchy. The platform hierarchy is intended for control by the platform manufacturer, represented by the early boot code shipped with the platform. For example, the platform hierarchy allows platform firmware, such as pre-boot code and BIOS code, to assure that TPM is enabled and that authorized code is executing, such as by verifying an RSA digital signature to authenticate firmware as part of the UEFI secure boot process.

SUMMARY OF THE INVENTION

Therefore, a need has arisen for a system and method which securely relates software entitlement to an information handling system hardware trusted platform.

In accordance with the present invention, a system and method are provided which substantially reduce the disadvantages and problems associated with previous methods and systems for managing software entitlement at an information handling system. A private platform key stored in a TPM validates an application verification signature included with an application before allowing access to an entitlement of the application, where a policy applied by the private key determines that the application is authorized for the information handling system based upon a unique identifier.

More specifically, an information handling system includes a trusted platform module, such as is compliant with TPM 2.0, that stores a private platform key generated at manufacture. The trusted platform module sends a public platform key to the manufacturer for storage at an entitlement database in association with a unique identifier of the information handling system. Upon a request at the information handling system to access an entitlement and/or at purchase of a software application, such as at installation of a software application stored on or downloaded to the information handling system, an entitlement system creates a verification signature with the public key to verify that the information handling system is entitled to access the software. The verification signature is sent to the information handling system and applied by the trusted platform module private key to verify the entitlement. For example, the trusted platform applies a policy to the verification signature with the private key that extracts a unique identifier and authorizes the entitlement if the unique identifier included with the verification signature matches the unique identifier of the information handling system.

The present invention provides a number of important technical advantages. One example of an important technical advantage is that an information handling system software entitlement securely ties to a hardware platform with a key integrated in the hardware platform at manufacture of the information handling system. Upon initiation of a software entitlement, such as with a purchase or activation of an application, a license key and signature inserted into the software is compared against a manufacture private key in a trusted platform to ensure that software is activated by a targeted information handling system and that the information handling system activates authentic software. The manufacturer's secure platform key prevents unauthorized use of software and does not require manual inputs by an end user, such as to input a license key. Further, a failure to match software at the information handling system to the secure platform key prevents unauthorized installation of software, such as by a replacement with a malicious copy.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A secure key integrated in an information handling system at manufacture manages software entitlements by securely associating authorization for executing software on the information handling system to a manufacturer approved source of the software. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
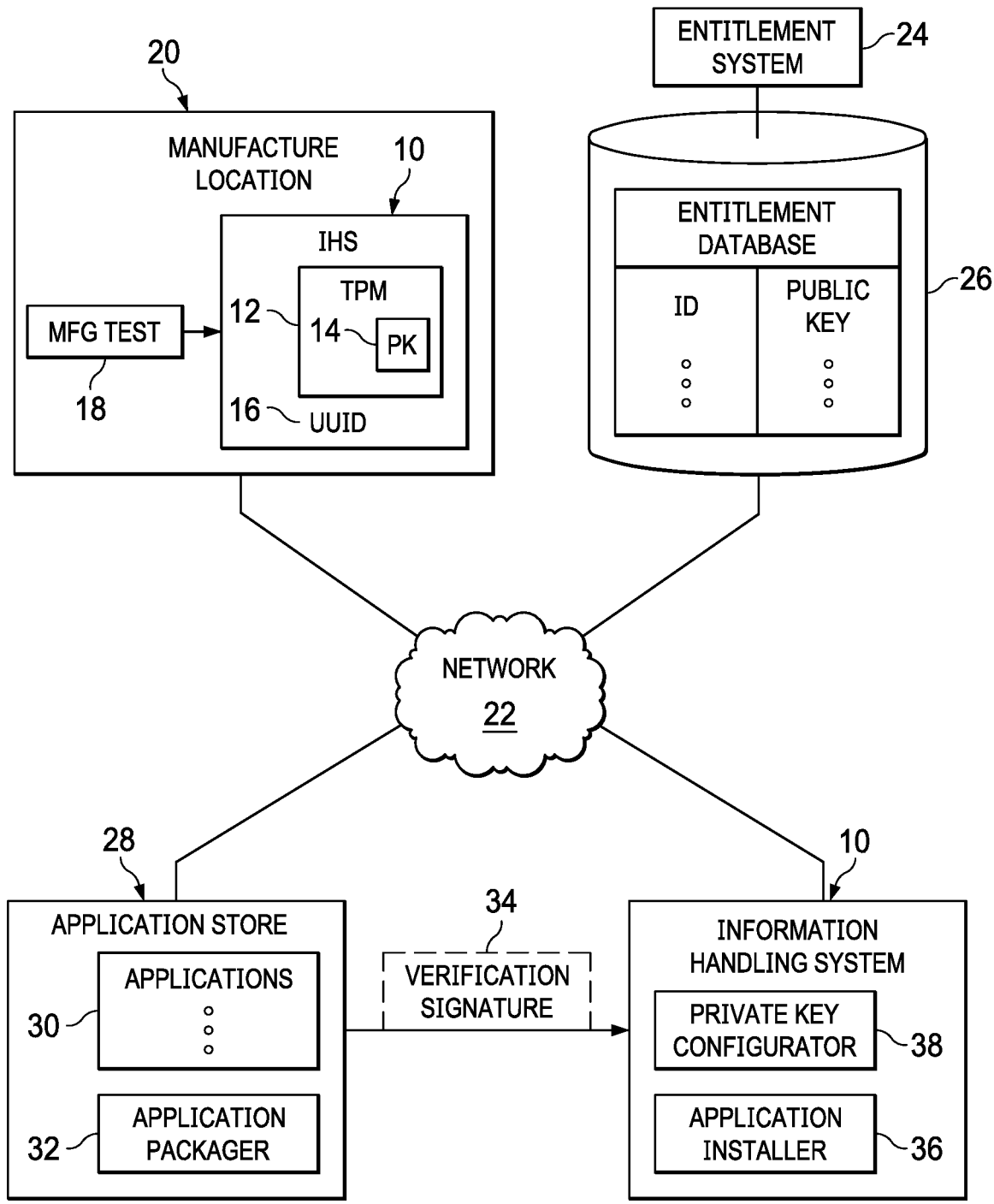
FIG. 1 depicts a block diagram of a system for configuring information handling systems at manufacture with a platform private key to track software entitlements for individual information handling systems.

Referring now to FIG. 1, a block diagram depicts a system for configuring information handling systems 10 at manufacture with a platform private key 14 to track software entitlements for individual information handling systems 10. In the example embodiment, information handling systems 10 built at a manufacture location 20 include a trusted platform module 12, such as is compliant with the TPM 2.0 standard, and a universally unique identifier (UUID), such as service tag or other identifier assigned by the information handling system manufacturer that uniquely identifies the information handling system. In one embodiment, multiple types of unique identifiers may be included, such as an enterprise identifier associated with an enterprise purchaser of multiple information handling systems. During manufacture at test of the hardware components by manufacture test equipment 18, such as during programming of the BIOS and pre-boot code, trusted platform module 12 generates a private platform key 14 and stores the private platform key in nonvolatile memory, such as a platform hierarchy key as defined by TPM 2.0. With the creation of the private platform key 14, trusted platform module 12 also creates a public key and provides the public key to manufacture test equipment 18. Once the private and public keys are created, the information handling systems 10 complete manufacture and is distributed to end users.

Manufacturer test equipment 18 interfaces through a network 22 with an entitlement system 24 to establish entitlement policies for manufactured information handling systems 10. For example entitlement system 24 is a server information handling system that manages an entitlement database 26 having unique identifiers and associated public keys for information handling systems manufactured by the manufacturer. When an information handling system distributed by the manufacturer seeks to use a software entitlement, such as installation of a new application or implementation of a new feature for an installed application, entitlement system 24 generates a verification signature 34 based upon the system's unique identifier(s) and platform hierarchy public key stored in entitlement database 26. As an example, a verification signature 34 may include one or more unique identifiers for the information handling system and a key for the application license encrypted under a defined platform policy using the public key. When the verification signature is received by the targeted information handling system, decryption using the private platform key and the platform policy provides to the trusted platform module 12 the unique identifier(s), thus confirming the information handling system as the intended target of the entitlement.

In the example embodiment, a distributed information handling system 10 interfaces with an application store 28 to purchase an application, such as by downloading and installing the application or activating a copy of the application already stored on information handling system 10. In response, application store 28 retrieves a verification signature 34 from entitlement system 24 for information handling system 10, such as based upon a unique identifier provided by information handling system 10. Application store 28 then integrates a copy of the application 30 as an application package with an application packager 32. For example, application packager 32 includes verification signature 34 received from entitlement system 24 tied to a license key for the application in an application package that an application installer 36 can apply to perform an application installation. In one embodiment, the application key is provided to entitlement system 24 so that the application key is included with verification signature 34. In another embodiment, verification signature 34 is communicated directly from entitlement system 24, either as a separate authorization to install application 30 in addition to an application package sent from application store 28 or as a separate authorization to activate the application. Once verification signature 34 arrives at information handling system 10, application installer 36 extracts verification signature 34 and provides the information encrypted by the public key to a private key configurator 38 for decryption by trusted platform module 12. For example, trusted platform 12 decrypts verification signature 34 and determines the unique identifier included with verification signature 34 to ensure that the unique identifier matches that of information handling system 10.

Application installer 36 proceeds with application installation if private key configurator 38 establishes an entitlement verified by a match of the system unique identifier. In one embodiment, an enterprises unique identifier is included with verification signature 34 and required before an application is activated so that an enterprise has a secure way to avoid personal use of enterprise information handling systems that involve execution of applications. For example, an enterprise unique identifier stored in entitlement database for systems purchased by an enterprise from the manufacturer is included in verification signatures to prevent applications from activation on the information handling system without the enterprise's approval. In various embodiments, a failure to match a unique identifier of a verification signature 34 at an information handling system 10 may initiate a variety of protective measures, such as locking the information handling system, deleting the application installation package, preventing communications from the information handling system related to the application, etc . . . .

Figure 2:
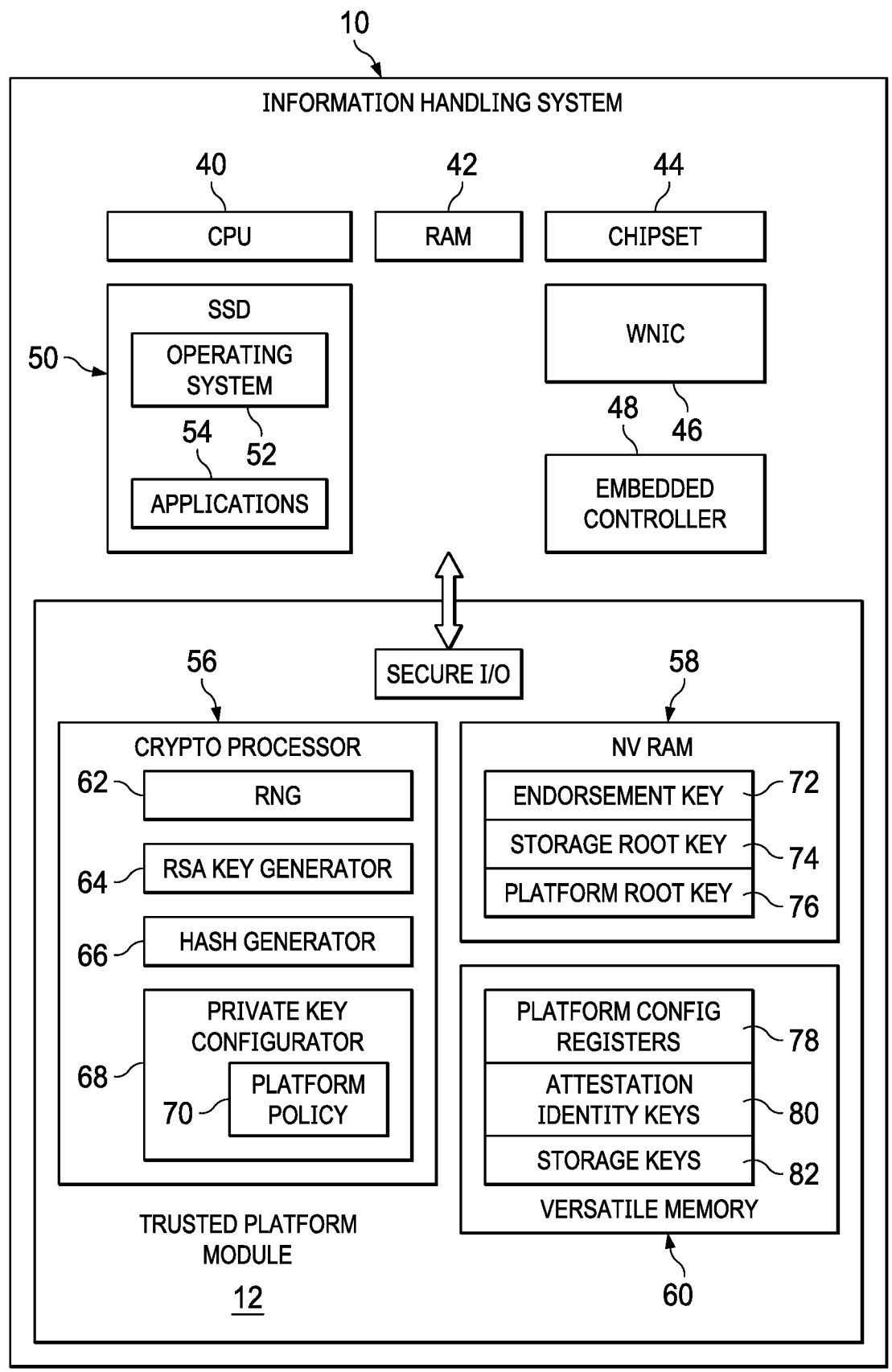
FIG. 2 depicts a block diagram of an information handling system having application entitlements verified against a private key before application installation.

Referring now to FIG. 2, a block diagram depicts an information handling system 10 having application entitlements verified against a private key before application installation. In the example embodiment, information handling system 10 executes instructions stored in random access memory 42 (RAM) with a central processing unit 40 (CPU). A chipset 44 includes a variety of processing components and embedded code stored in flash memory to coordinate interactions with CPU 40. A wireless network interface card (WNIC) 46 provides communication with external devices, such as through a local area network (LAN) or wireless local area network (WLAN). An embedded controller 48 manages interactions with peripheral devices, such as a keyboard and mouse, and application of power. A solid state drive (SSD) 50 provides persistent storage of information, such as an operating system 52 and one or more applications 54. For example, operating system 52 provides an application programming interface (API) that coordinates interaction by applications 54 with software and hardware components of information handling system 10.

In the example embodiment, trusted platform module 12 is a secure processing component, such as a system on chip, compliant with the TPM 2.0 standard. Trusted platform 12 interfaces with CPU 40 through a secure input/output interface, such as coordinated with operating system 52 and firmware elements of chipset 44. A cryptoprocessor 56 performs cryptographic processing functions with integrated hardware elements and/or firmware stored in memory, such as nonvolatile RAM 58 or versatile memory 60. For example, a random number generator 62 provides random numbers for secure encryption, such as by reference to an RSA key generated by RSA key generator 64 or a hash generator 66. A private key generator 68 includes a platform policy 70 that supports generation of a platform private key and associated public key. NVRAM 58 stores keys created by cryptoprocessor 56, such as an endorsement key 72, a storage root key 74 and a platform root key 76. Versatile memory 60 provides storage of information that support cryptoprocessor 56, such as platform configuration registers 78, attestation identity keys 80 and storage keys 82.

In operation, at manufacture cryptoprocessor 56 executes private key configurator 68 to create a private platform key 76 and associated public platform key, which is communicated to the system manufacture. In addition, platform policy 70 is set to define crypto functions associated with platform key 76. For instance, a format is defined for data provided in a verification signature so that, upon decryption with platform key 76, cryptoprocessor 56 extracts a unique identifier of the information handling system. In one embodiment, trusted platform module 12 returns the unique identifier to operating system 52 for comparison with a unique identifier submitted with the request for an application entitlement. In another embodiment, a comparison of a verification signature unique identifier is made with a unique identifier stored in trusted platform 12 to ensure a match, with a favorable or unfavorable match returned to operating system 52. In various embodiments, a verification signature policy may be applied with cooperation between trusted platform 12 and other processing components of information handling system 10.

Figure 3:
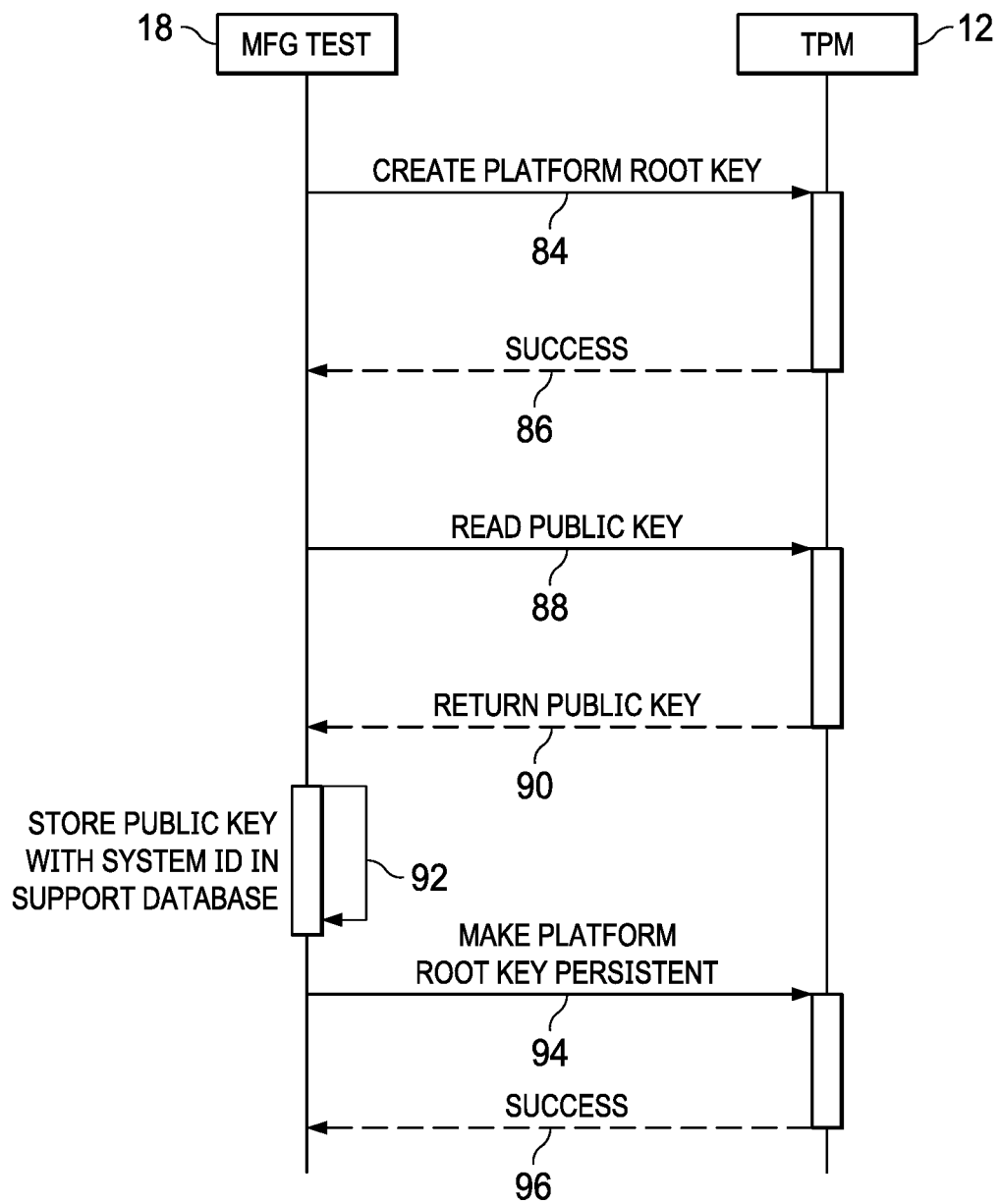
FIG. 3 depicts a flow diagram of process for configuring a platform private key at an information handling system.

Referring now to FIG. 3, a flow diagram depicts a process for configuring a platform private key at an information handling system, such as at manufacture of the information handling system. The process starts at a manufacture test 18 with a command at step 84 sent to the trusted platform 12 to create a platform private key. At step 86, trusted platform 12 sends a success response. At step 88, manufacture test 18 sends a command to read the public key from trusted platform 88. At step 90, trusted platform 12 returns the public key to manufacture test 18, and at step 92 manufacture test 18 stores the public key with a system identifier for the information handling system in a support database. The process completes at step 94 with a command for trusted platform 12 to make the platform key persistent and a success returned to the manufacture test 18 at step 96.

Figure 4:
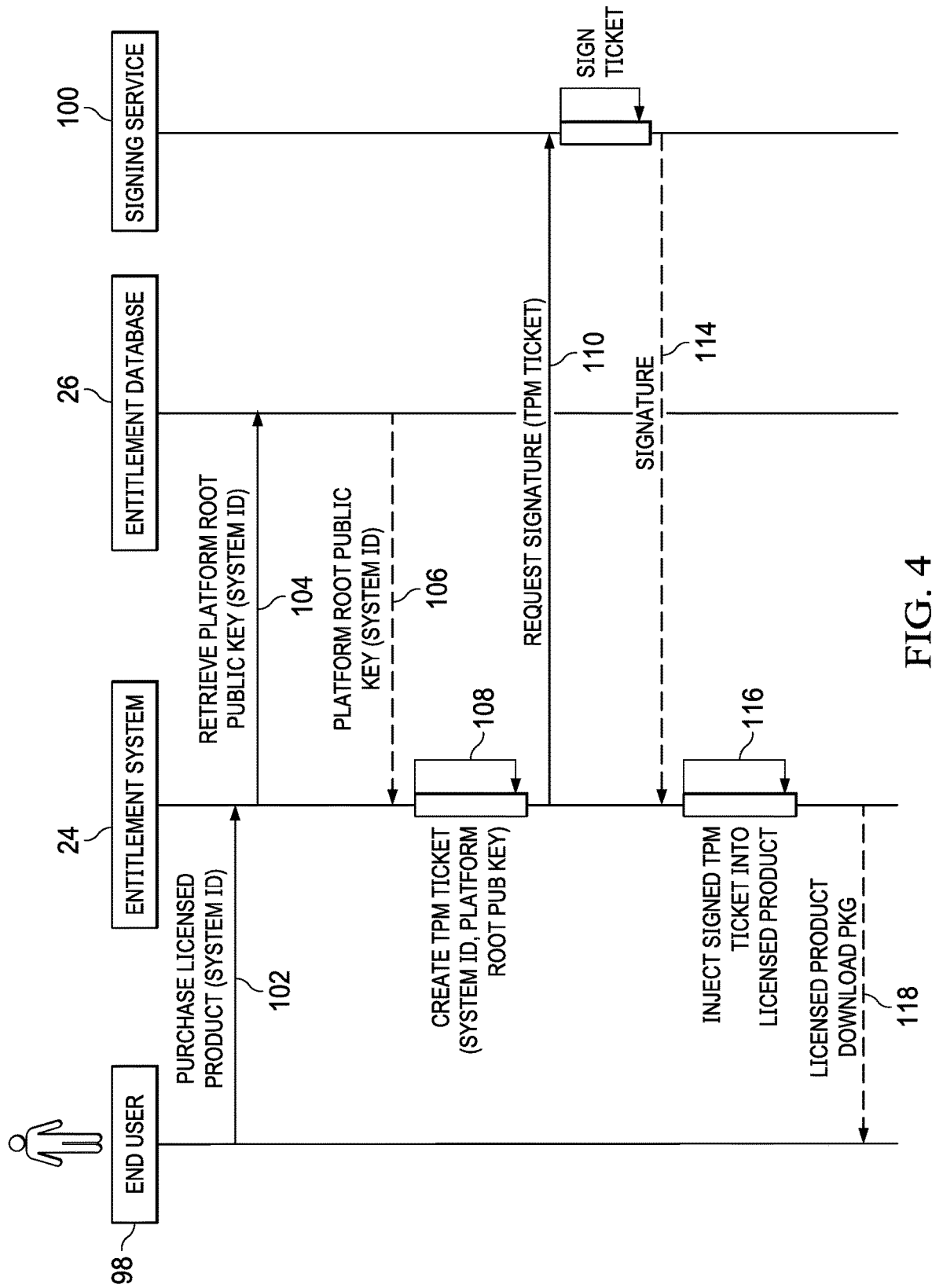
FIG. 4 depicts a flow diagram of a process for including a verification signature with an application installation package sent to an individual information handling system.

Referring now to FIG. 4, a flow diagram depicts a process for including a verification signature with an application installation package sent to an individual information handling system. The process starts with a user 98 with purchase of a licensed product at step 102 that includes submission of the unique identifier for the information handling system. Entitlement system 24 receives the purchase request and, in response, at step 104 retrieves the platform public key associated with the unique identifier submitted with the purchase. At step 106, the platform public key is returned for the unique identifier and at step 108, a trusted platform module ticket is created with the public key that includes the unique identifier and public key. At step 110, the trusted platform module ticket is sent to a signing service 100 so that at step 112 a signed ticket is created and returned at step 114 to entitlement system 24. At step 116, the signed trusted platform module ticket is inserted into the licensed product as a verification signature and at step 118 and licensed product download package is created for communication to the information handling system, such as including a license key for the application, with the unique identifier used to order the license product included and encrypted by a public key associated with the unique identifier. The installation package as sent from entitlement system 24 will thus restrict use of the application to the information handling system having the unique identifier.

Figure 5:
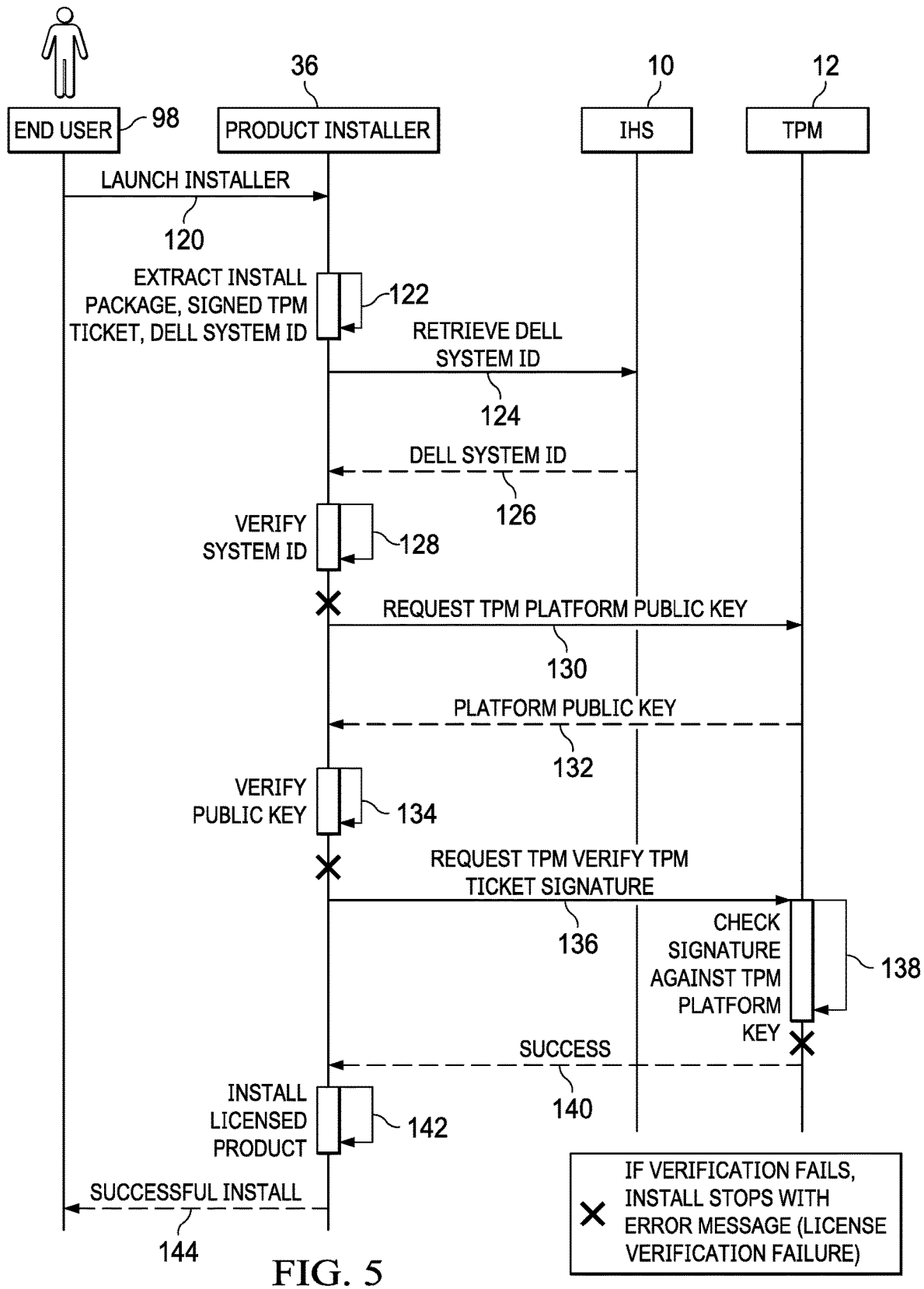
FIG. 5 depicts a flow diagram of a process for installing an application at an information handling system verified by a private platform key.

Referring now to FIG. 5, a flow diagram depicts a process for installing an application at an information handling system verified by a private platform key. The process begins with an end user at step 120 launching an installer for the application from an installation package having the verification signature injected into it. At step 122 the installation package extracts the verification signature having the signed trusted platform module ticket and the system identifier. At step 124 the system identifier is retrieved from memory of the information handling system 10 and at step 126 returned to the product installer 36. At step 128, the retrieved system identifier is compared against the identifier included in the installation package and, if a match does not exist the process stops with an error message. If at step 128 the system identifier included with the installation package matches the system identifier retrieved from memory of information handling system 10, the process continues to step 130 to request the public key from trusted platform module 12. The public key is returned at step 132 and, at step 134, compared against the public key provided with the installation package. If the public keys do not match, the process stops with an error message. If at step 134 the public keys match, the process continues to step 136 to request verification of the verification signature from trusted platform module 12. At step 138 trusted platform module 12 applies the private key to decrypt the verification signature and apply the platform policy to ensure that the platform is authorized to install the application. For example, the decrypted verification signature is parsed to ensure a matching unique identifier and, if appropriate, enterprise approval for installation of the application. If the verification signature fails to verify the application, the process stops and an error message is issued. If success is returned at step 140, the process continues to step 142 to install the licensed product and at step 144 return an indication of successful installation to the end user. In the example embodiment, verification is associated with installation of an application, however, in alternative embodiments, verification may be initiated for installed products to verify that an information handling system is executing only applications approved for it.

Although the present invention has been described in detail, it should be understood that various changes, substitutions and alterations can be made hereto without departing from the spirit and scope of the invention as defined by the appended claims.

What is claimed is:

1. A method for managing verification of application entitlements at plural information handling systems, the method comprising:

initiating creation of a platform private key unique to each of the plural information handling systems at manufacture of the plural information handling systems;

storing the unique platform private key in trusted platform module nonvolatile memory of each associated information handling system;

retrieving a public key from each of the plural information handling systems;

storing the public key in a database in association with a unique identifier of each of the plural information handling systems;

encrypting an application verification signature for one of the plural information handling systems with the public key associated with the one of the plural information handling systems;

inserting the application verification signature into a copy of the application;

communicating the application to the one of the plural information handling systems;

extracting the application verification signature from the copy of the application before installation of the application on the one of the plural information handling systems; and restricting the application at the one of the plural information handling systems until the trusted platform module verifies the application verification signature with the private key.

2. The method of claim 1 wherein the restricting further comprises:

decrypting the application verification signature with the private key; and verifying the application verification signature if it includes a unique identifier of the one of the plural information handling systems.

3. The method of claim 1 further comprising:

storing an enterprise unique identifier on the one of the plural information handling systems; and verifying the application verification signature if it includes the enterprise unique identifier.

4. The method of claim 1 wherein restricting further comprises:

determining the application verification signature is not valid; and in response to the determining, deleting the application.

5. The method of claim 1 further comprising:

communicating the application verification signature to the one of the plural information handling systems in response to a request to activate a copy of the application stored on the one of the plural information handling systems; and in response to the communicating, parsing the application verification signature to determine if a unique identifier included in the application verification signature matches a unique identifier stored on the one of the plural information handling systems.

\* \* \* \* \*